United States Patent
Bihlmaier et al.

(10) Patent No.: US 7,991,581 B2
(45) Date of Patent: Aug. 2, 2011

(54) METHOD AND SYSTEM FOR ANALYZING INTERLINKED PRODUCTION PROCESSES FOR MANUFACTURING A PRODUCT

(75) Inventors: Ralf Bihlmaier, Winnenden (DE); Markus Friese, Stuttgart (DE); Holger Stephan, Stuttgart (DE)

(73) Assignee: Daimler AG, Stuttgart (DE)

( * ) Notice: Subject to any disclaimer, the term of this patent is extended or adjusted under 35 U.S.C. 154(b) by 376 days.

(21) Appl. No.: 12/249,286

(22) Filed: Oct. 10, 2008

(65) Prior Publication Data

US 2009/0099815 A1 Apr. 16, 2009

(30) Foreign Application Priority Data

Oct. 12, 2007 (DE) .......................... 10 2007 048 959

(51) Int. Cl.
*G06F 11/30* (2006.01)
*G06F 19/00* (2011.01)
(52) U.S. Cl. ....................................... 702/182
(58) Field of Classification Search ................... 702/182; 700/97
See application file for complete search history.

(56) References Cited

U.S. PATENT DOCUMENTS

| | | | |
|---|---|---|---|
| 7,233,834 B2 * | 6/2007 | McDonald et al. | 700/108 |
| 2003/0150908 A1 * | 8/2003 | Pokorny et al. | 235/375 |
| 2006/0282186 A1 * | 12/2006 | Hansen et al. | 700/97 |
| 2007/0067056 A1 * | 3/2007 | Nishinohara et al. | 700/97 |
| 2007/0078553 A1 * | 4/2007 | Miwa et al. | 700/97 |

* cited by examiner

*Primary Examiner* — Cindy Hien-Dieu Khuu
(74) *Attorney, Agent, or Firm* — Crowell & Moring LLP (57) ABSTRACT

A method and system for analyzing interlinked production processes for manufacturing a product are provided. Static and dynamic input data for at least one product parameter or process parameter are acquired. At least one degree of freedom of the at least one product parameter or process parameter is determined. At least one target parameter is acquired. The acquired static and dynamic input data are processed on the basis of at least one degree of freedom and, the at least one product parameter or process parameter is automatically adjusted. At least some of the data determined and acquired are stored or output.

14 Claims, 7 Drawing Sheets

METHOD AND SYSTEM FOR ANALYZING INTERLINKED PRODUCTION PROCESSES FOR MANUFACTURING A PRODUCT

CROSS REFERENCE TO RELATED APPLICATIONS

This application claims priority under 35 U.S.C. §119 to German Patent Application No. 102007048959.7, filed Oct. 12, 2007, the entire disclosure of which is herein expressly incorporated by reference.

BACKGROUND AND SUMMARY OF THE INVENTION

The invention relates to a method and a system for analyzing interlinked production processes for manufacturing a product, such as a motor vehicle.

In the operation of automated production plants, for example production plants in vehicle manufacture, attempts have been made to improve production by controlling the multiplicity of interlinked production processes in an optimum manner with regard to high flexibility and variable capacity.

Production processes comprise, in particular, material, technical, organizational and/or personnel-related transformation processes with added value. In this case, not only material-oriented and/or energy-oriented factors but also temporal and/or monetary factors are important.

Production aim, for example fault-free production or production which maximizes profit, various methods for determining planning or production strategies are known. For example, the article entitled "A Stochastic Programming Approach for Supply Chain Network Design Under Uncertainty" by Santoso et al. (Technical Report, School of Industrial & Systems Engineering, Georgia Institute of Technology, 2003) discloses an analysis of interlinked production processes. The disadvantage of the known analysis of interlinked production processes is that capacity adjustments, site changes, changes in demand, capacity decisions, product assignment decisions are not taken into account at the same time. In addition, standard commercial target variables and temporal interactions between periods are also disregarded. This is due to, inter alia, the great complexity of interlinked production processes and the large number of changes and adjustments to, and decisions regarding, both technical and material, monetary, organizational, personnel-related and temporal factors. The possibility of analyzing the processes is therefore very limited and it is virtually impossible to perform this analysis in a manual fashion.

Therefore, exemplary embodiments of the invention provide methods and systems for analyzing interlinked production processes for manufacturing a product, such as a motor vehicle.

In accordance with the present invention, an exemplary method involves the steps of:
a) acquiring static and dynamic input data for at least one product parameter and/or a process parameter using a data processing unit,
b) determining at least one degree of freedom of one or more product parameters and/or process parameters,
c) acquiring at least one target parameter for at least one product parameter and/or process parameter,
d) processing the acquired static and dynamic input data for the relevant product parameters and/or process parameters on the basis of at least one degree of freedom and automatically adjusting at least one of the product parameters and/or process parameters,
e) at least some of the data determined and acquired in steps a) to d), such as input data, product parameters, process parameters and/or target parameters, are stored and/or output.

The advantage of the inventive method for analyzing interlinked production processes for manufacturing one or more products is that the method is subdivided into individual steps in which data and parameters associated with different properties are processed in different directions with different degrees of freedom with regard to one or more target parameters. It is advantageous, in particular, that so-called MIP optimization (MIP=Mixed Integer Programming) may be employed, which ensures integrated modelling of the interlinked production processes with temporal, monetary, technical, material and/or organizational factors and their optimum configuration. Such modelling makes it possible to considerably reduce the amount of planning needed for production systems and production processes. In particular, current and/or future production processes can be analyzed and adjusted within a very short space of time by acquiring associated input data. As a result, production strategies can be automatically generated for complex interlinked production processes. In this case, additional parameters, in particular economic and/or monetary additional parameters, such as depreciation, depreciation periods, start-up losses, legal provisions, organizational, technical, temporal, product-specific, process-specific and/or material changes, for example workforce flexibility, production capacity changes, can be taken into account. In addition, such integrated analysis and modelling of all interlinked production processes enables a high level of traceability and transparency in production planning as a result of structured data management and the use of simple mathematical optimization methods.

In a first possible configuration of the invention, steps a) to e) can be carried out iteratively and the data determined in a respective iteration can be compared with one another. At least one of the product parameters and/or process parameters can be expediently adjusted using the comparison of data from different iterations. For example, predicted data for future periods and instantaneous data, the approximation of which can be used to generate optimum production strategies for short-term, medium-term and/or long-term periods, can be acquired as the input data.

In another configuration of the invention, technical capacities, for example available raw materials, product components, vehicle parts, at least one product requirement, for example the instantaneous and/or future demand, instantaneous and/or future market data, demand for a series, desired product extras, product changes, for example instantaneous and/or future product versions, possible product combinations, possible dual uses, are predefined as product parameters. Alternatively or additionally, one or more production sites, for example the number of product lines and/or production areas, organizational capacities, for example available shifts, available production lines and/or production areas, available production line flexibility, available tool capacity, utilization, dual use or reuse of production areas, conversion, construction and/or interlinking of product lines, and/or personnel-related capacities, such as workforce capacity, workforce flexibility, can be predefined as process parameters.

In this case, the number of predefined product and/or process parameters is reduced to a number of indicative production and/or process parameters. That is to say, those parameters which achieve a particular and desired effect are determined and predefined as product and/or process parameters for the integrated analysis and modelling of the interlinked production processes. For example, a multiplicity of product and/or process parameters may be stored in the form of standard parameters or variables, a reduced number of product and/or process parameters, which indicate a predefinable target parameter, being determined, selected and/or predefined from the multiplicity of stored product and/or process parameters on the basis of the relevant target parameter. Taking into account only indicative product and/or process parameters in this manner considerably reduces the number of required parameters and auxiliary conditions to be generated in the integrated analysis and modelling of the interlinked production processes. In addition, the complexity of the integrated analysis and modelling is simplified to a considerable extent. Parameters, such as "transport links" and "product/partial product links", are thus predefined and taken into account when determining, for example, process links.

Depending on the kind or type of parameter, the associated data are predefined in different ways. The data for the product and/or process parameters are preferably subdivided into two groups of values. On the one hand, the data may be predefined as analogue values or constant values, for example analogue values of transport volumes and production volumes. On the other hand, the data may be predefined in the form of discrete values, for example discrete values for capacity levels (=0/1). For example, the value predefined for the parameter "transport link to the market/end customer/dealer" only for permissible product combinations, production line combinations and possible market combinations is a discrete value of, for example, "zero" for impermissible and "one" for permissible. A value for one of the selected or predefined parameters may also be predefined or determined only when this parameter is relevant to the current analysis on the basis of other indicative parameters, for example if there is a demand for the relevant combination, for example a market and product combination, in the respective period of time.

In this case, the number of discrete parameters decisively determines the complexity of the analysis and modelling. The product and/or process parameters are preferably predefined as analogue parameters. Discrete parameters, for example "stage switch" and "switch link", whose states are described in the form of discrete "on"/"off" or "activated"/"deactivated" values, can usually be defined as constant and analogue by appropriately combining them with other parameters, in particular with the target parameter and/or other product and/or process parameters, with predefinable auxiliary or additional conditions, as a result of which the outlay, in particular the temporal outlay, on the analysis and modelling of the interlinked production processes is considerably reduced.

In another aspect of the invention, at least one temporal variable, for example a period, a product distribution and/or line occupancy in each period, one product-related variable, for example an assignment of products to production lines and/or production areas, and/or one capacity-related variable, for example dynamic adjustment of organizational, technical and/or personnel-related capacities, in particular investments, production of one or more different series on one or more production lines, dual use or reuse of production lines and/or production areas, can be predefined as degrees of freedom.

For further simplification and/or restriction of the analysis and modelling, the latter can be carried out for a predefinable period of time. In this case, at least one of the product parameters and/or process parameters can be additionally adjusted for a predefinable period of time. This makes it possible to generate a production strategy in a particularly flexible and variable manner.

In another advantageous configuration of the invention, at least one of the product parameters and/or process parameters is acquired and adjusted monetarily. As a result, primary or secondary economic aspects, such as added value, loss, profit, can also be taken into account, analyzed and/or assessed, in addition to primary technical, material-oriented, product-related and organizational aspects, when generating production strategies.

In addition, limit values, for example limit capacities, and/or standard values, for example models of working hours, shift models, personnel master data, can be predefined for at least one of the product parameters and/or process parameters. The use of standard values and/or limit values makes it possible to carry out the analysis and modelling in a quick and simple manner.

Furthermore, in another aspect of the invention, at least one of the acquired and/or adjusted product parameters and/or process parameters can be assessed and output. For example, differences between generated analyses, models, concepts, their cost-effectiveness, in particular the cost-effectiveness of individual parameters or a plurality of parameters, if appropriate in combination with one another, for example unit cost advantages, utilization, delivery capacity, can thus be determined and assessed, for example by means of a simple comparison. The method for analyzing interlinked production processes can also be used to determine capacity and/or flexibility variables and production strategies.

Depending on the stipulation, at least one of the acquired and/or adjusted product parameters and/or process parameters can be output individually, in combination and/or in relation to one another, for example in the form of a graph. The graph can be, for example, a cost/time graph, a cost/capacity graph and/or a capacity/time graph.

The inventive system for analyzing interlinked production processes for manufacturing at least one product, in particular a motor vehicle, comprises a predefinable number of modules which are described by way of example below using their functions:

a) a module that acquires static and dynamic input data for at least one product parameter and/or process parameter,    b) a module that determines at least one degree of freedom of one or more product parameters and/or process parameters,    c) a module that acquires at least one target parameter for at least one product parameter and/or process parameter,    d) a module that processes the acquired static and dynamic input data for the relevant product parameters and/or process parameters on the basis of at least one degree of freedom and for automatically adjusting at least one of the product parameters and/or process parameters,    e) a data memory that stores, and/or at least one output means for outputting, at least some of the data determined and acquired in steps a) to d), such as input data, product parameters, process parameters and/or target parameters, the modules being stored in a data processing unit and being able to be controlled and executed by a computer program implemented in said data processing unit.

Other objects, advantages and novel features of the present invention will become apparent from the following detailed description of one or more preferred embodiments when considered in conjunction with the accompanying drawings.

BRIEF DESCRIPTION OF THE DRAWINGS

Exemplary embodiments of the invention are explained in more detail using a drawing, in which.

DETAILED DESCRIPTION OF THE DRAWINGS

Parts which correspond to one another are provided with the same reference symbols in all figures.

Figure 1:
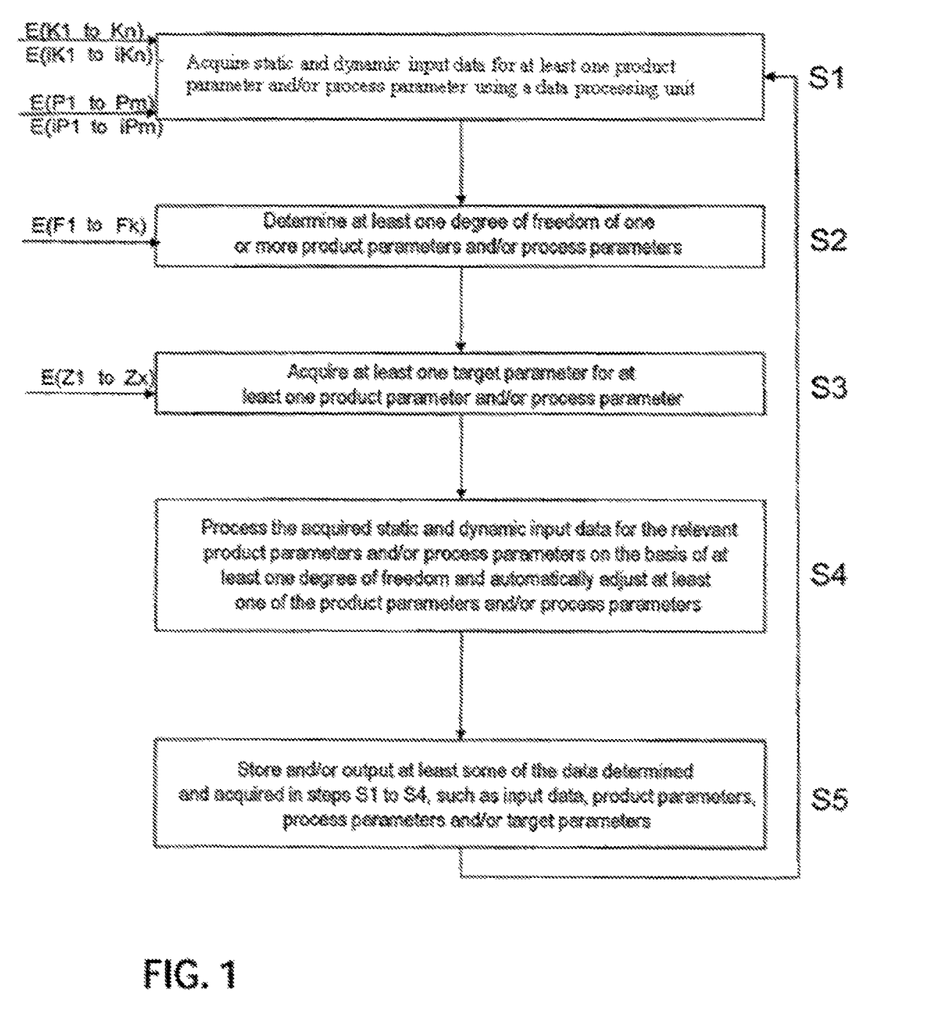
FIG. 1 diagrammatically shows a flowchart for a method for analyzing interlinked production processes for manufacturing at least one product, FIG. 2 diagrammatically shows a system for analyzing interlinked production processes for manufacturing at least one product, FIG. 3 diagrammatically shows the implementation of the method according to FIG. 1 in a method for the strategic and operational planning of the production processes, FIG. 4 diagrammatically shows different exemplary embodiments for outputting determined and/or adjusted product and/or process parameters on the basis of one another and/or at least one degree of freedom in a possible output sequence, which is automatically generated during the analysis and modelling, with respect to a predefinable target parameter.

FIG. 1 shows a flowchart for a method for analyzing interlinked production processes for manufacturing at least one product, in particular a motor vehicle, which is characterized by the following steps S1 to S5:

In step S1 static and dynamic input data E for at least one product parameter K1 to Kn and/or process parameter P1 to Pm or indicative product parameter iK1 to iKn and/or process parameter iP1 to iPm are acquired.

In step S2 at least one degree of freedom F1 to Fk of one or more product parameters K1 to Kn, iK1 to iKn and/or process parameters P1 to Pm, iP1 to iPm is determined.

In step S3 at least one target parameter Z1 to Zx for at least one product parameter K1 to Kn, iK1 to iKn and/or process parameter P1 to Pm, ip1 to iPm is acquired.

In step S4 the acquired static and dynamic input data E for the relevant product parameters K1 to Kn, iK1 to iKn and/or process parameters P1 to Pm, iP1 to iPm are processed on the basis of at least one degree of freedom F1 to Fk and at least one of the product parameters K1 to Kn, iK1 to iKn and/or process parameters P1 to Pm, iP1 to iPm is automatically adjusted.

In step S5 at least some of the data determined and acquired in steps S1 to S4, such as input data E, product parameters K1 to Kn, iK1 to iKn and/or process parameters P1 to Pm, iP1 to iPm, degrees of freedom F1 to Fk and/or target parameters Z1 to Zx, are stored and/or output.

In this case, the analysis and modelling method can be subdivided into further individual steps Sn (not described in any more detail) and/or substeps or partial steps (not described). The analysis and modelling method can also be carried out iteratively by repeating steps S1 to S5, the data determined in a respective iteration step then being compared with one another and the resultant comparison results being used to adjust one of the data items, such as input data E, product parameters K1 to Kn, iK1 to iKn and/or process parameters P1 to Pm, iP1 to iPm, degrees of freedom F1 to Fk and/or target parameters Z1 to Zx.

In the inventive method which is described by way of example using steps S1 to S5, the number of product parameters K1 to Kn, iK1 to iKn and/or process parameters P1 to Pm, iP1 to iPm is reduced to a predefinable number of indicative product parameters iK1 to iKn and/or process parameters iP1 to iPm in order to simplify the integrated analysis and modelling of interlinked production processes, such as complex production sequences having a plurality of production lines, production sites and/or production areas, as occur in the manufacturing of vehicles in the automotive industry. That is to say, in the method, recourse is had only to those required variables or parameters and their associated input data E, such as measured values, desired values, actual values, which achieve a particular and desired effect and thus achieve the predefinable target parameter Z1 to Zx.

The target parameter Z1 to Zx may be, for example, one of the product parameters K1 to Kn, one of the process parameters P1 to Pm and/or one of the degrees of freedom F1 to Fk. In one possible embodiment, the parameters "links" and/or "capacity levels", which are indicated by associated indicative process parameters iP1 to iPm and/or indicative product parameters iK1 to iKn, for example "transport links", "transport costs" or "permissible production lines", "availability of the permissible production lines", "production line capacity", are predefined, for example, as one or more target parameters Z1 to Zx. Further combinations of indicative parameters iKn, iPn and target parameters Z1 to Zx may be predefined in order to generate standard analyses and standard modelling, as a result of which the temporal outlay is considerably reduced in addition to the simplification and reduction in the complexity of the analysis and modelling.

In detail, technical capacities, such as available raw materials, product components, vehicle parts, a product requirement (e.g. demand), market data, series, extras, product changes (e.g. versions), product combinations, can be predefined, for example, as product parameters K1 to Kn or indicative product parameters iK1 to iKn. Alternatively or additionally, one or more production sites, such as the number of product lines, organizational capacities, such as available shifts, available tool capacity, utilization, conversion, construction and interlinking of product lines, personnel-related capacities, such as staff, can be predefined as process parameters P1 to Pm or indicative process parameters iP1 to iPm.

Further simplification is achieved if limit values, for example limit capacities, and/or standard values, for example models of working hours, shift models, personnel master data, are predefined for the product parameters K1 to Kn, iK1 to iKn and/or process parameters P1 to Pm, iP1 to iPm. The relevant parameters, such as input data E, product parameters K1 to Kn, iK1 to iKn, process parameters P1 to Pm, iP1 to iPm, degrees of freedom F1 to Fk and/or target parameters Z1 to Zx, in particular the type of their values or data, may also be predefined. In this case, said parameters are preferably defined in the form of analogue variables with analogue values having a constant profile. The values may also be discrete.

At least one degree of freedom F1 to Fk is understood as meaning, for example, a temporal variable, such as one or more cyclic or non-cyclic periods, a temporal or local product distribution, line occupancy in each period. A product-related variable, for example an assignment of products to production lines/production areas, and/or a capacity-related variable, for example dynamic adjustment of organizational, material, technical and/or personnel-related capacities, can also be predefined as a further degree of freedom F1 to Fx.

During the subsequent processing of the input data E for the relevant parameters, for example the indicative product parameters iK1 to iKn and/or indicative process parameters iP1 to iPm, that is to say processing of the input data E on the basis of relevant, for example selected, degrees of freedom F1 to Fk and/or target parameters Z1 to Zx, integrated analysis and modelling of the underlying production processes, in their complexity with all links, is automatically carried out and generated. In this case, conventional, preferably linear or non-linear, optimization methods, for example finding the minimum or maximum of at least one one-dimensional function, can be used to process the input data E.

Figure 2:
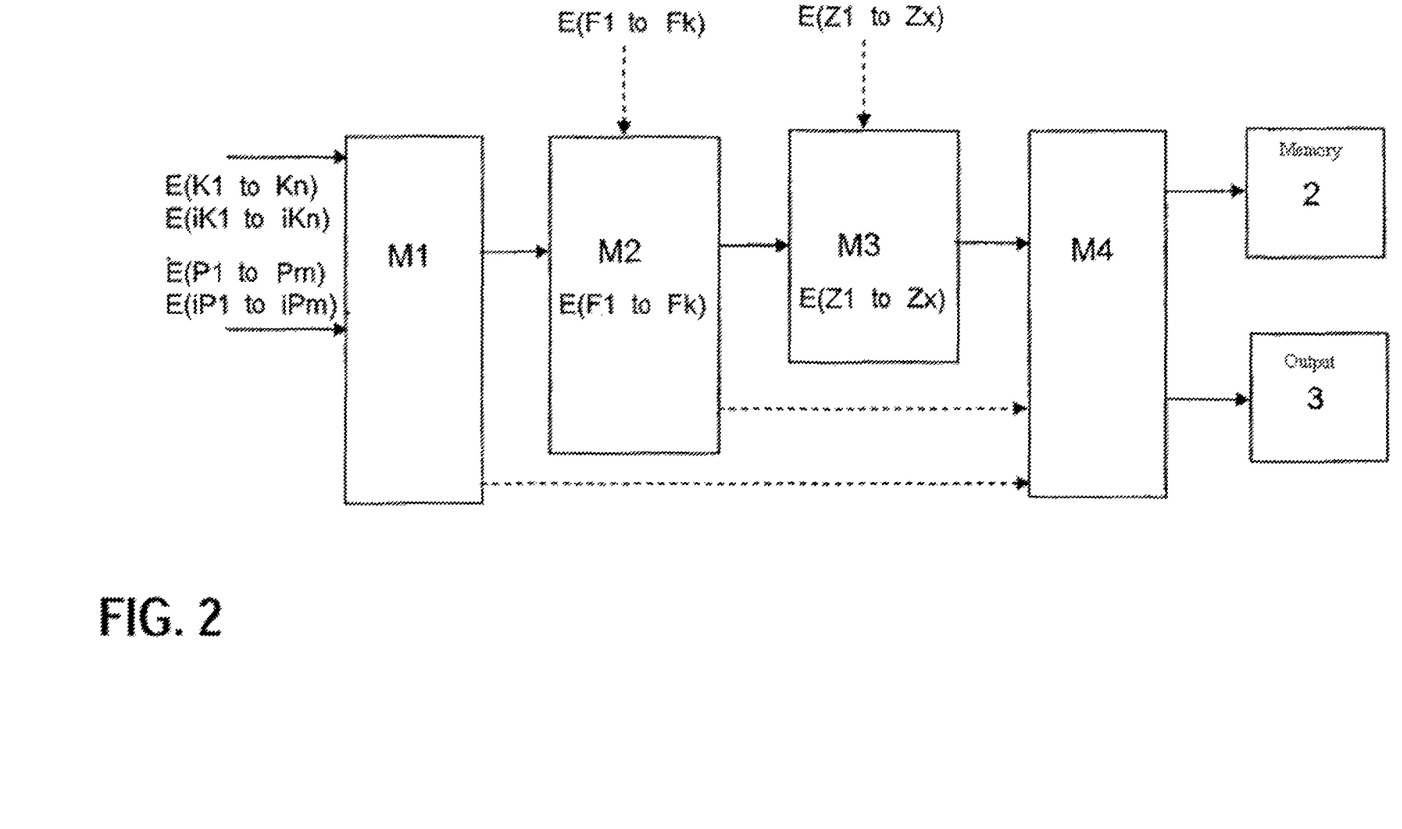

FIG. 2 diagrammatically shows an exemplary embodiment of a system 1 for analyzing and modelling the interlinked production processes. Depending on the desired degree of analysis and/or modelling and on the basis of the number and subdivision of the method steps S1 to S5 illustrated by way of example in FIG. 1, the number of modules M1 to M5 for carrying out the analysis method may vary. The modules M1 to M5 are stored in a data processing unit (not described in any more detail), for example a production control device or microprocessor, and can be controlled and executed using a computer program implemented in the latter.

A number of exemplary modules M1 to M5 which, in particular, carry out the method according to FIG. 1 are described in more detail below using their functions. In this case, a first module M1 acquires the static and dynamic input data E for the product parameters K1 to Kn, iK1 to iKn and/or process parameters P1 to Pm, iP1 to iPm. A further downstream module M2 determines and/or inputs or selects one of the degrees of freedom F1 to Fk. The module M3 acquires or predefines the target parameter Z1 to Zx. The modules M1 to M3 which are in the form of, for example, input, selection and/or storage units are connected to a further module M4 for processing the acquired static and dynamic input data E for the relevant product parameters K1 to Kn, iK1 to iKn and/or process parameters P1 to Pm, iP1 to iPm on the basis of at least one degree of freedom F1 to Fk and for automatically adjusting at least one of the product parameters K1 to Kn, iK1 to iKn and/or process parameters P1 to Pm, iP1 to iPm. The data or results determined can then be stored in a data memory 2. Alternatively or additionally, the data and results may be output on an output means 3, for example a display. Depending on the stipulation, partial results and data associated with at least some of the data determined and acquired in steps S1 to S5, such as input data E, product parameters K1 to Kn, iK1 to iKn, process parameters P1 to Pm, iP1 to iPm, degrees of freedom F1 to Fk and/or target parameters Z1 to Zx, can also be output in this case.

Figure 3:
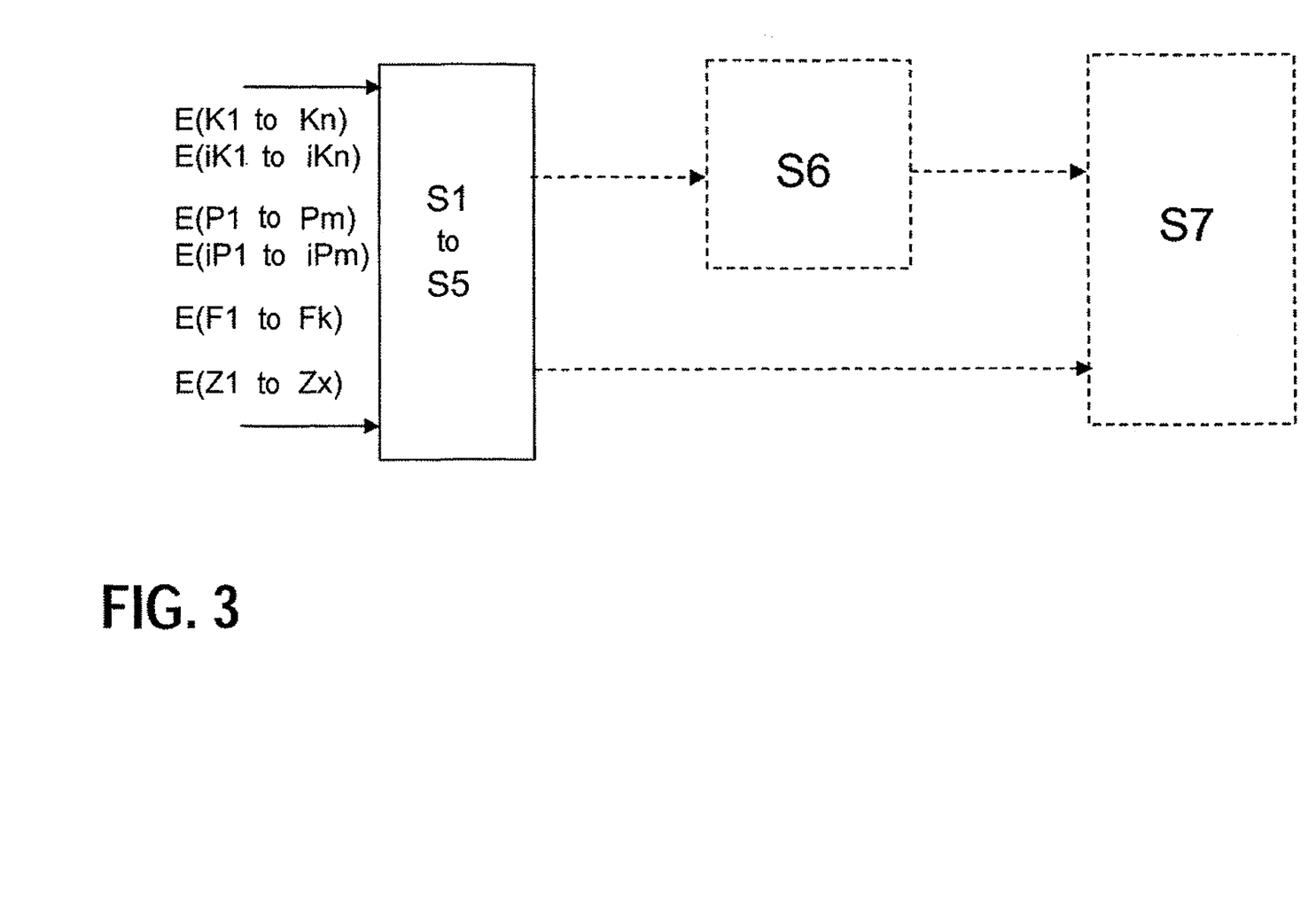

FIG. 3 shows a further possible way of using the inventive analysis and modelling method, the latter being implemented in a method for the strategic and operational planning of the production processes. In this case, following the analysis method according to the steps S1 to S5 carried out and described by way of example above, further methods, for example an assessment method (=S6) and an adjustment method (=S7), are subsequently carried out in further steps S6 and S7. In the assessment method according to step S6, the production strategies determined and generated using the analysis and modelling method according to steps S1 to S5, in particular flexibility and/or capacity strategies, can be assessed and taken into account in the strategic planning of new production processes or the existing interlinked production process. Alternatively or additionally, the production strategies determined and generated, in particular flexibility and/or capacity strategies, can be adapted to current production processes in step S7 by operationally changing or adjusting them to the strategies determined, for example.

Figure 4:
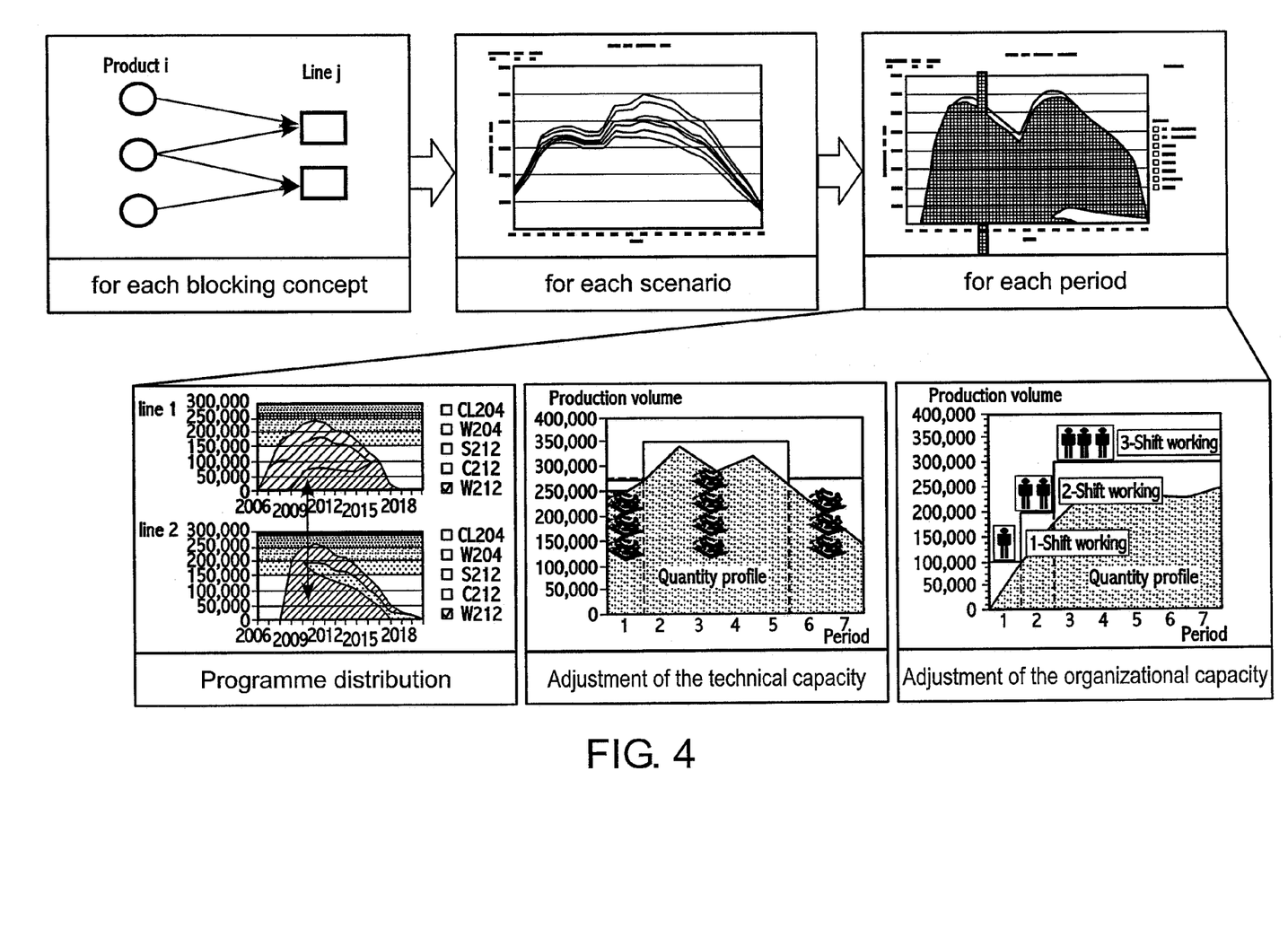

FIG. 4 diagrammatically shows different exemplary embodiments for outputting determined and/or adjusted product and/or process parameters K1 to Kn, P1 to Pm on the basis of one another and/or at least one degree of freedom F1 to Fk in a possible output sequence, which is automatically generated during the analysis and modelling, with respect to a predefined target parameter Z1.

Figure 5:
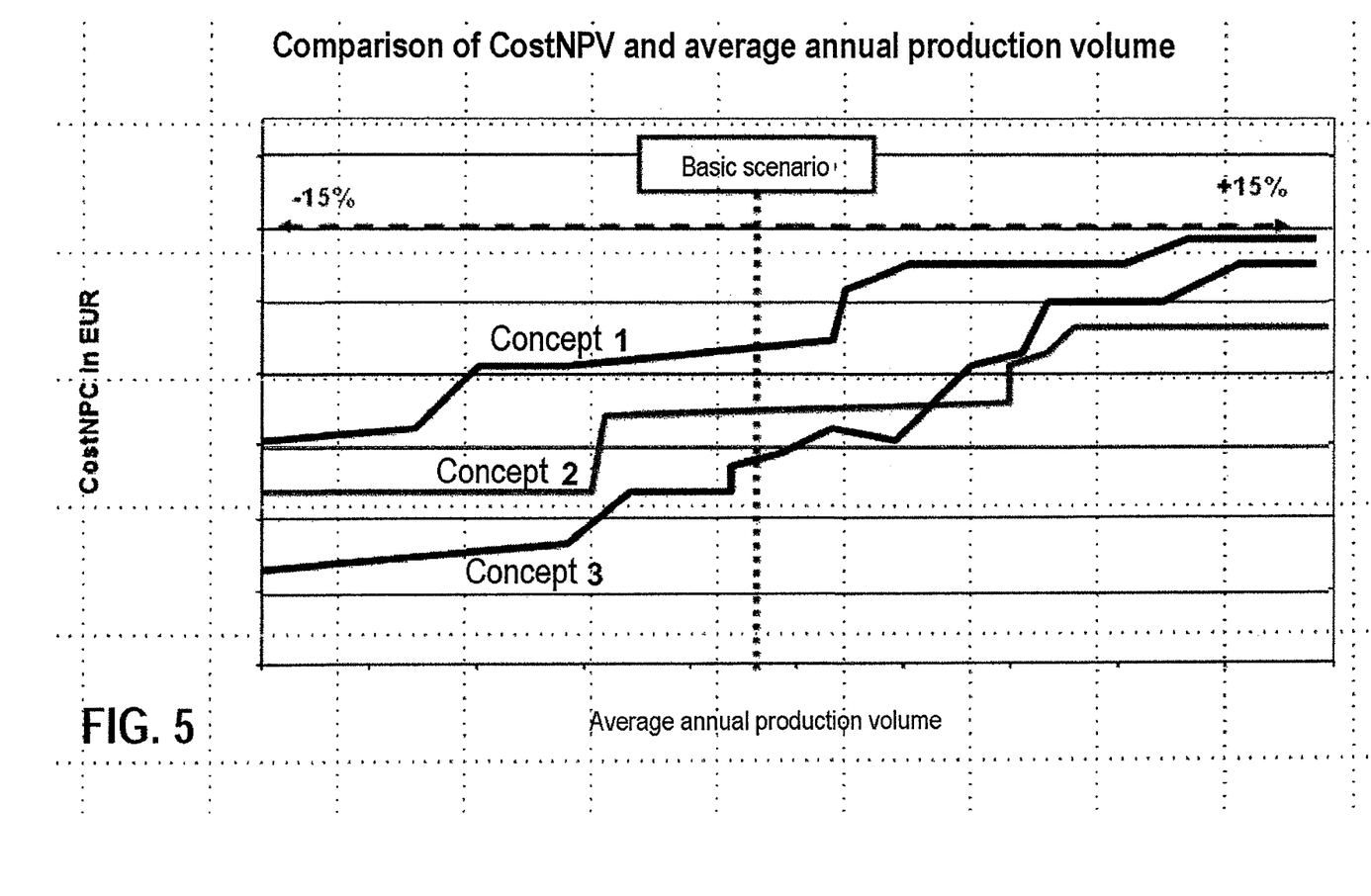
FIGS. 5 to 7 show different exemplary embodiments for outputting determined and/or adjusted product and/or process parameters in the form of functions.
Figure 6:
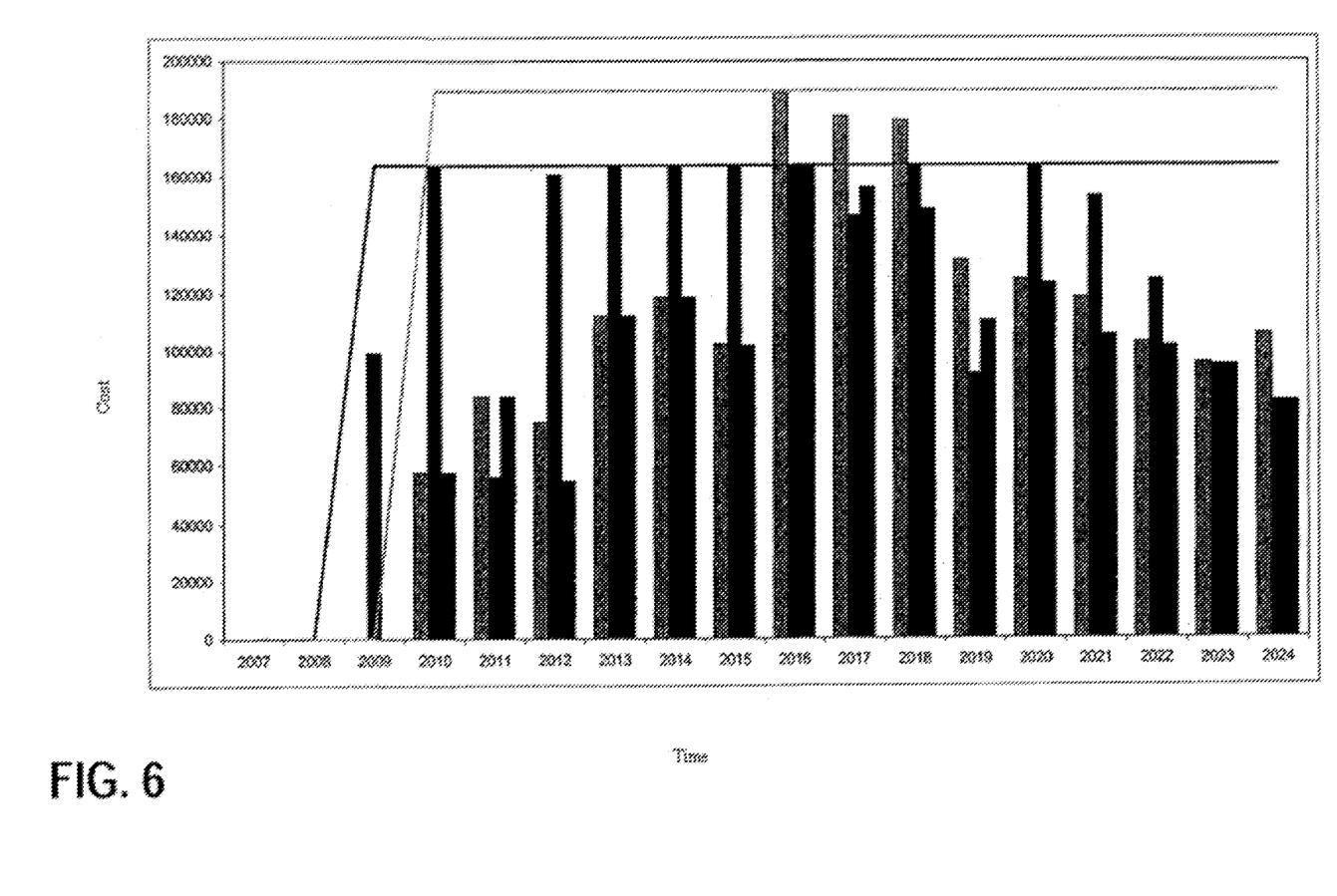
Figure 7:
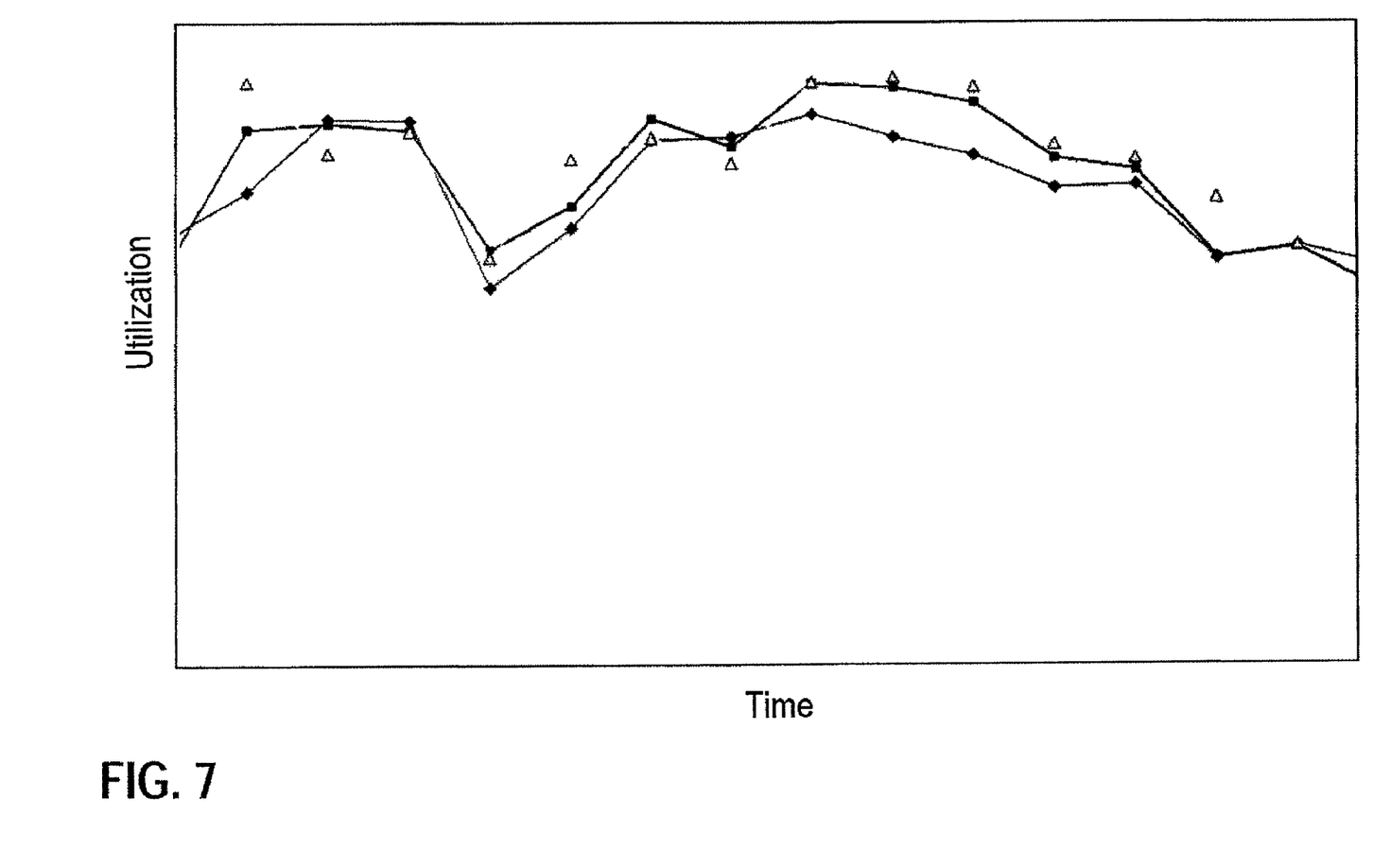

FIGS. 5 to 7 show different exemplary embodiments for outputting determined and/or adjusted product and/or process parameters K1 to Kn, P1 to Pm in the form of functions on the basis of production volumes and/or predefinable periods of time t. In this case, the product parameters K1 to Kn, iK1 to iKn and/or process parameters P1 to Pm, iP1 to iPm can be predefined and acquired monetarily. By way of example, FIG. 5 shows a cost/volume graph, FIG. 6 shows a cost/time graph and FIG. 7 shows a capacity/time graph.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for analyzing interlinked production processes for manufacturing a product, the method comprising the steps of:
   a) acquiring, using a data processing unit, static and dynamic input data for a plurality of product parameters and a plurality of process parameters;
   b) determining at least one degree of freedom of the plurality of product and process parameters;
   c) acquiring at least one target parameter for each of the plurality of product and process parameters;
   d) processing the acquired static and dynamic input data for the plurality of product and process parameters on the basis of the at least one degree of freedom, and automatically adjusting at least one of the plurality of product and process parameters;
   e) storing or outputting at least some of the data determined and acquired in steps a) to d).

2. The method according to claim 1, wherein steps a) to e) are carried out iteratively and data determined in a respective iteration are compared with one another.

3. The method according to claim 2, wherein at least one of the plurality of product and process parameters is adjusted using the comparison of data from different iterations.

4. The method according to claim 1, wherein technical capacities, product demand, product changes are predefined as product parameters.

5. The method according to claim 1, wherein one or more production sites, organizational capacities, personnel capacities are predefined as process parameters.

6. The method according to claim 1, wherein at least one temporal, product-related or capacity-related variable is predefined as a degree of freedom.

7. The method according to claim 1, wherein at least one of the plurality of product and process parameters is adjusted for a predefinable period of time.

8. The method according to claim 1, wherein at least one of the plurality of product and process parameters is acquired and adjusted monetarily.

9. The method according to claim 1, wherein limit values or standard values are predefined for at least one of the plurality of product and process parameters.

10. The method according to claim 1, wherein at least one of the acquired product parameters, adjusted product parameters or process parameters is assessed and output.

11. The method according to claim 1, wherein at least one of the acquired product parameters, adjusted product parameters or process parameters is output in the form of a graph.

12. The method of claim 1, wherein the method employs Mixed Integer Programming (MIP) optimization for the processing.

13. A system that analyzes interlinked production processes for manufacturing a product, the system comprising:
  a) a module that acquires static and dynamic input data for a plurality of product parameters and a plurality of process parameters;
  b) a module that determines at least one degree of freedom of the plurality of product and process parameters;
  c) a module that acquires at least one target parameter for each of the plurality of product and process parameters;
  d) a module that processes the acquired static and dynamic input data for the plurality of product and process parameters on the basis of at least one degree of freedom and that automatically adjusts at least one of the plurality of product and process parameters;
  e) a data memory that stores or at least one output means for outputting, at least some of the data determined and acquired in steps a) to d), wherein the modules are computer instructions executed by a data processing unit.

14. The system of claim 13, wherein the system employs Mixed Integer Programming (MIP) optimization for the processing.

* * * * *